UNITED STATES PATENT OFFICE.

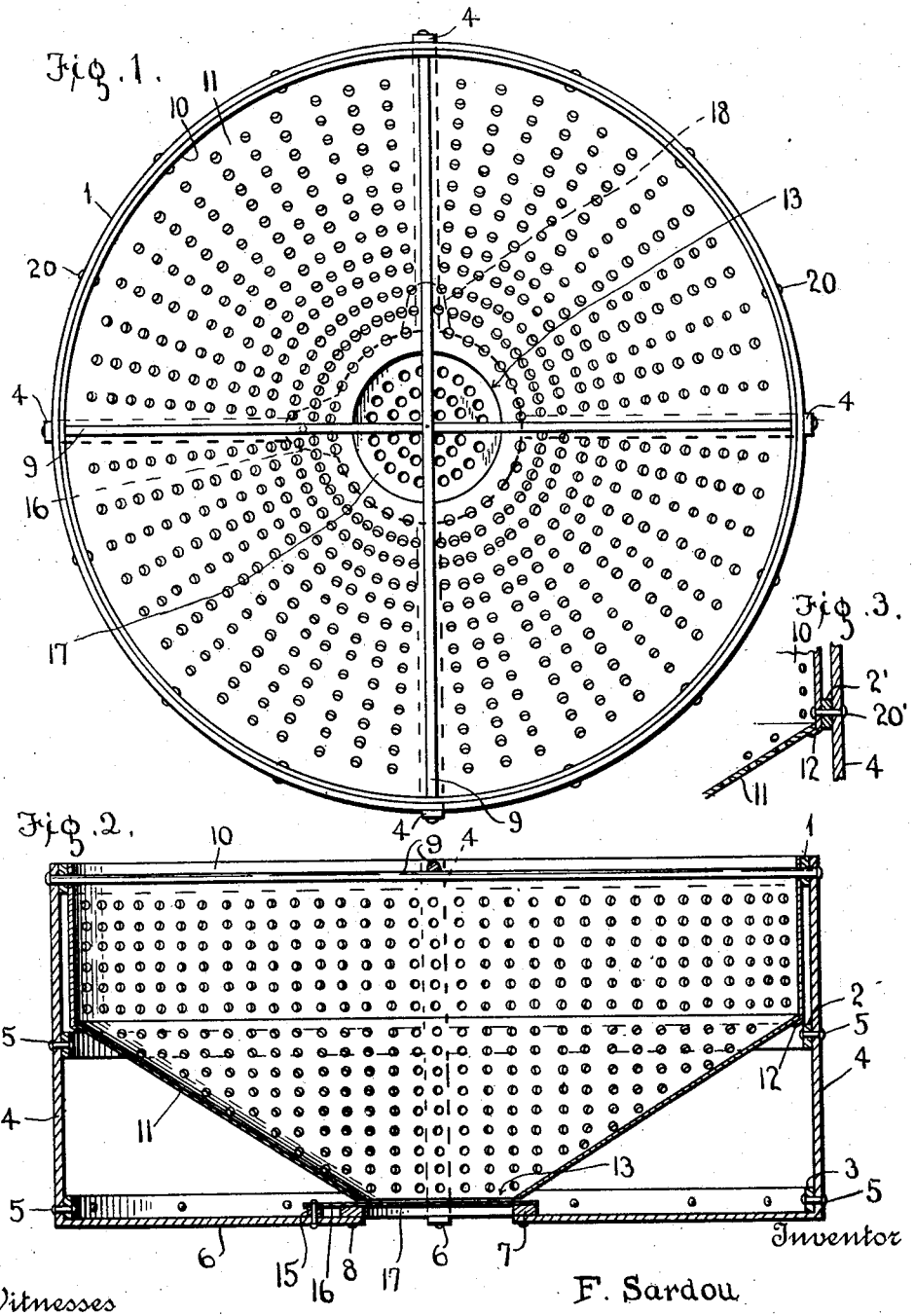

FREEMAN SARDOU, OF TOPEKA, KANSAS.

STEAMER.

1,033,274.  Specification of Letters Patent. Patented July 23, 1912.

Application filed January 8, 1912. Serial No. 670,113.

*To all whom it may concern:*

Be it known that I, FREEMAN SARDOU, a citizen of the United States, residing at Topeka, in the county of Shawnee and State of Kansas, have invented certain new and useful Improvements in Steamers; and I do declare the following to be a full, clear, and exact description of the invention, such as will enable others skilled in the art to which it appertains to make and use the same.

This invention relates to cooking vessels, and more especially to steamers; and the object of the same is to produce an improved form of basket by means of which fruit or vegetables may be steamed in bulk, and then conveyed in bulk to and quickly delivered into a pulping machine.

To this end the invention consists in the specific details of construction of the steamer described in the following specification and shown in the drawings wherein—

Figure 1 is a plan view of this steamer complete, and Fig. 2 is a central cross section thereof; Fig. 3 is a sectional detail of a slightly different arrangement of the intermediate hoop.

I may say in brief that in canning factories it is customary at present to put a large charge of fruit or vegetables into a basket or cage made of foraminous material and essentially of metal, then hoist and carry the same by suitable machinery to a chamber into which the basket is inserted or which may possibly be large enough to contain a stack of said baskets, there to treat the material with dry steam for a given length of time and until it is of the proper consistency, then reopen the chamber and remove the basket or baskets, and carry or convey them to the pulping machine by means of which the cooked and soft material is to be macerated or pulped, as for instance when pumpkins are to be made into pies. Heretofore the material after it has been steamed or cooked and while it was yet quite soft was removed from the basket and put into the pulping machine by means of scoops, or in some cases by carrying the baskets bodily to the machine and inverting them—either of which courses was extremely unsatisfactory and insanitary.

The object of the present invention is to improve the construction of such a steaming basket or cage so that its strength shall be increased without the sacrifice of its capacity, complication of parts shall be avoided so that it may be washed easily, and its construction shall be such that in order to dump the contents it is not necessary to invert these baskets or to use any tools whatever.

Coming now more particularly to the details of the present invention, the numerals 1, 2 and 3 designate superimposed hoops of strap iron about one half inch thick and an inch and one half in width, and of a diameter only slightly less than the internal diameter of the chamber (not shown) into which the steamer is to be inserted. These hoops are held in spaced relation to each other by four similar members of L-shape, also made of strap iron, their upright portions 4 standing outside the various hoops and secured thereto as by rivets 5 or otherwise, and their horizontal portions 6 standing in a single plane and projecting inward beneath the lowermost hoop to a ring 7 concentric therewith and preferably also made of strap iron, and to which the extremities of said portions 6 are secured as by rivets 8. Connecting the upper ends of the upright portions 4 are long rods 9 crossing each other at the center of the device as shown, and the structure thus far described constitutes an open-work cage of great strength proportionate to its weight which is not excessive. Within said cage is disposed a receptacle of foraminous material, whether it be sheet metal perforated with holes of a desired size, or wire fabric, and the same comprises a cylinder 10 of a circumference to fit within the uppermost hoop 1, and a conical bottom 11 secured around its periphery at 12 to the lower edge of the cylinder 10 and with its walls converging downward thence to the open lower end or mouth 13. The outlet is by preference of the same size as the interior of the ring 7, with which it registers as seen in Fig. 2, although the conical bottom is suspended above and not in contact with said ring. Pivoted to a block 15 on one of the horizontal arms 6 is an ear 16 at one side of a round gate 17, also made of foraminous material as seen in Fig. 1, the same having a handle 18 by which it may be manipulated; and when this gate stands under the open lower end 13 of the conical bottom 11, it rests upon the ring 7 so as to firmly support the contents of the receptacle directly above the gate, the remainder of the contents being of course supported by the conical bottom 11.

While the upper edge of the cylinder 10 is supported by the extremities of the rods 9, and in addition may be riveted as at 20 to the upper loop 1; if this improved steamer be made of quite large size I prefer to raise the intermediate hoops 2' as shown in Fig. 3 and employ rivets 20' passing through the uprights 4, the hoop 2', and the lower edge of the cylinder 10 adjacent its junction 12 with the bottom 11, thereby giving the device the additional strength which it needs on account of its size.

Other changes in the details of construction may suggest themselves to the manufacturer or user, and may be made without departing from the principle of my invention.

It is essential that the body of this steamer be of foraminous material so that the steam may pass through it with ease and gain access to the contents, but the size of the perforations or the mesh will be such as required by the fruit or vegetables treated.

In the use of this improved steamer, it is filled with the material to be treated, inserted into and removed from the steaming chamber in the manner above described or in any preferred manner, and carried to the pulping machine in any way desired; but at this point instead of inverting it or using an independent implement to shovel the cooked contents into the pulper, it is only necessary to turn the gate 17 to one side by pushing the handle 18 in the proper direction.

What is claimed as new is:

1. The herein described fruit and vegetable steamer comprising a plurality of superimposed metallic hoops, a ring concentrically disposed within the lowermost hoop, means for holding it in place, a gate slidable over said ring, pivotal connections between it and one of said hoops, a receptacle of foraminous material having a cylindrical body whose upper end is secured within the uppermost hoop, and a conical bottom whose edge is secured to the lower end of said body and whose open lower end stands over and concentric with said ring.

2. The herein described fruit and vegetable steamer comprising a receptacle consisting of a cylindrical body and conical bottom having its lower end open; three superimposed hoops, two of which are secured around said body, four L-shaped members whose upright portions are secured outside the three hoops and whose horizontal portions project radially inward beneath the lowermost hoop, a ring secured upon their innermost extremities, a gate pivoted to one of said horizontal portions and resting upon said ring beneath the lower end of the conical bottom, and rods crossing each other at their centers and with their extremities passing through said body, the uppermost hoop, and the upper ends of said L-shaped members.

In testimony whereof I have hereunto set my hand in presence of two subscribing witnesses.

FREEMAN SARDOU.

Witnesses:
DOUGLAS LITTLE,
JOSEPH R. MICHAEL.